United States Patent [19]

Bonde

[11] Patent Number: 5,433,664
[45] Date of Patent: Jul. 18, 1995

[54] ADJUSTABLE CHAFF SPREADER FOR COMBINE

[75] Inventor: Randall W. Bonde, Belmond, Iowa

[73] Assignee: Lee, Ltd., Belmond, Iowa

[21] Appl. No.: 205,313

[22] Filed: Mar. 2, 1994

[51] Int. Cl.6 ............................................. A01F 12/00
[52] U.S. Cl. .................................... 460/111; 460/901
[58] Field of Search ................ 460/111, 112, 113, 901

[56] References Cited

U.S. PATENT DOCUMENTS 4,617,942  10/1986  Garner ................................. 460/112
4,637,406   1/1987  Guinn et al. ......................... 460/112

*Primary Examiner*—Terry Lee Melius

[57] ABSTRACT

A chaff spreader for attachment to a farm combine. The spreader rotates to spread chaff discharged from the combine and is readily removable and adjustable to the discharge opening in the combine. Novel safety rings are provided on the rotating spreader to protect operators or others who might come into contact with the rotor.

3 Claims, 1 Drawing Sheet

ADJUSTABLE CHAFF SPREADER FOR COMBINE

BACKGROUND AND SUMMARY OF THE INVENTION

This invention pertains to crop harvesting devices such as combines and more particularly to a fan device to be removably installed at the discharge from a combine and which will distribute the chaff from that end in a safe manner and over a neatly prescribed area.

Nearly all farm combines now discharge straw, stalk, chaff and the like from an opening located at the rear of the combine. This material is somewhat distributed by a horizontally rotating beater device adapted to break up clumps of material. Frequently these beaters are used in pairs sometimes with meshed blades. However, even with the overlap, much chaff and finer particles fall through the blades.

By the present invention an auxiliary spreading device is provided. Particularly in fields subject to "no-till" or "minimum till" farming, it is very desirable to have the most nearly possible, even division of waste material. When a field is plowed, this material is readily disposed of regardless of spreading. However, when seed is to be planted in unplowed ground on top of last year's refuse as it is in "no-till" farming, it becomes highly desirable to have a relatively even distribution of that refuse.

To accomplish the distribution, a secondary distribution is desirable, and for that purpose, added devices to accomplish the desired result have been used. The present invention is for an improved secondary distribution device. The novel device is readily mounted and removed, is flexibly adjustable for best distribution and is constructed so as to be safer than the normal distributing devices.

DESCRIPTION

Figure 1:
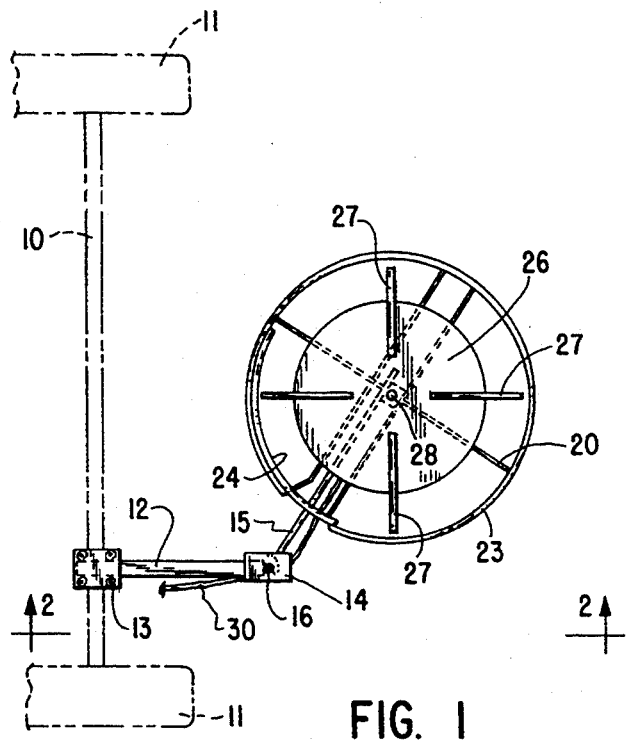
FIG. 1 is a top plan view of the spreader mounted on an axle of a combine.

Briefly this invention comprises an auxiliary device for a farm combine which is readily attachable to the combine, truly adjustable as to position near the waste outlet of the combine, and relatively safe in its operation because of its construction.

More specifically and referring to the drawings, the spreader device is adapted for attachment to the rear axle 10 of a combine mounted on wheels 11. A support arm 12 is clamped to the axle 10 by means of clamping plates 13. This arm 12 in turn is fitted with a pair of indexing plates 14, one above and one below the arm 12.

A swing arm 15 is pivotally attached to the support arm 12 through a pivot pin 16 extending through the plates 14 and the swing arm 15. For the sake of any disassembly, the pin 16 may be simply slipped through the arm 15 and the plates, or, it may be held in place by having a nut threaded onto its lower end or a cotter key may extend through the pin. These latter expedients are common and well known in the art.

Figure 4:
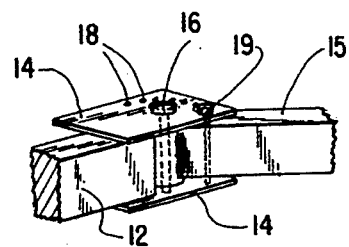
FIG. 4 is a detailed view of the adjustment device allowing swingable adjustment of the spreader.
Figure 2:
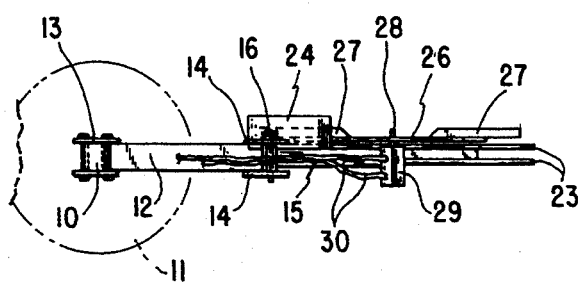
FIG. 2 is a side elevational view of the spreader from line 2—2 of FIG. 1.
Figure 3:
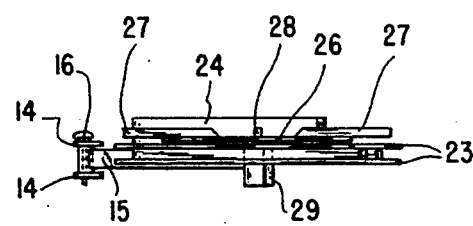
FIG. 3 is a partial end elevational view of the spreader and a part of its attaching mechanism.

To hold the spreader rotor, later described, in an adjusted position, series of holes 18 (FIG. 4) extend through the plates 14. These holes are arranged in an arcuate pattern on the plates and thus are in position to register with a hole extending through the swing arm 15. By extending an indexing pin 19 through one opposing pair of holes 18 in the plates 14 and through the hole in the arm 15, the arm can thus be held in one of a plurality of swingable positions relative to the support arm 12.

At its outer end, the swing arm 15 carries a cross member 20 (FIG. 1). This cross member 20 combined with the arm 15 provides a framework to which a safety guard may be attached. The guard illustrated includes a pair of rings 23 formed on a diameter large enough to surround the rotor described later. Further guards in the form of arcuate plates 24 may be attached to the rings 23 if it is deemed desirable to keep the chaff away from certain parts of the ring. For example, a plate 24 is preferably placed near the juncture of the rings 23 with the swing arm 15 to keep chaff away from the pivot pin 16 and indexing pin 19 and from the holes into which those pins extend.

The spreading fan is pivotally mounted within the rings 23 and on the framework provided by the swing arm 15 and cross member 20. The fan comprises a disc 26 and a series of flexible bats 27, preferably made of rubber, attached to that disc. The disc is attached to the spindle 28 of an hydraulic motor 29 which is fixed to the swing arm 15. Hydraulic hoses 30 lead from the hydraulic system of the combine through proper controls (not shown) to the motor 29 allowing that motor 29 to be controlled as needed from the cab of the combine.

In use, the cleaner is attached to the combine. On large machines, it is quite possible to use two of the cleaners fastened to opposite sies of the axle 10. The necessary hydraulic connections to the combine are made for power and control so that the cleaners will rotate. At that point it is a simple matter to swing the swing arm 15 to the optimum position to receive material not properly spread by the regular beaters on the combine and to pin the swing arm in its adusted position. Then, as the machine runs through the field, the motor 29 can be started and the spreader will receive material from the combine and sling it out onto the ground.

It will be apparent that with the flexible bats 27 and the guard rails 23, that this device is relatively safe. Also, because of the adjustability of the swing arm 15, the spreader can be readily adjusted for best efficiency.

I claim as my invention:

1. A chaff spreader for use in combination with a farm combine having a rear axle and a chaff discharge opening, said spreader comprising support means, said support means including a support arm, clamping means adapted to clamp said support arm releasably to said axle, a swing arm pivotally connected to said support arm, fan means rotatably supported by the end of said swing arm remote from the pivotal connection, driving means connected to said combine to receive power therefrom, said driving means adapted to drive said fan means rotatively, and guard means surrounding said fan means and mounted on said support means to prevent foreign articles from coming into contact with said fan means.

2. The spreader of claim 1 which said fan means includes a disc, flexible bats mounted on said disc extending substantially radially therefrom, said disc being adapted to receive chaff from said discharge opening, said bats being adapted to spread said chaff outwardly from said disc.

3. The spreader of claim 1 in which indexing means to control the relative position of said support arm and said swing arm is connected between said support and swing arms adjacent the pivotal connection.

* * * * *